Feb. 18, 1969
E. WILDHABER
3,427,901
GEARING
Filed Oct. 14, 1966
Sheet 1 of 2
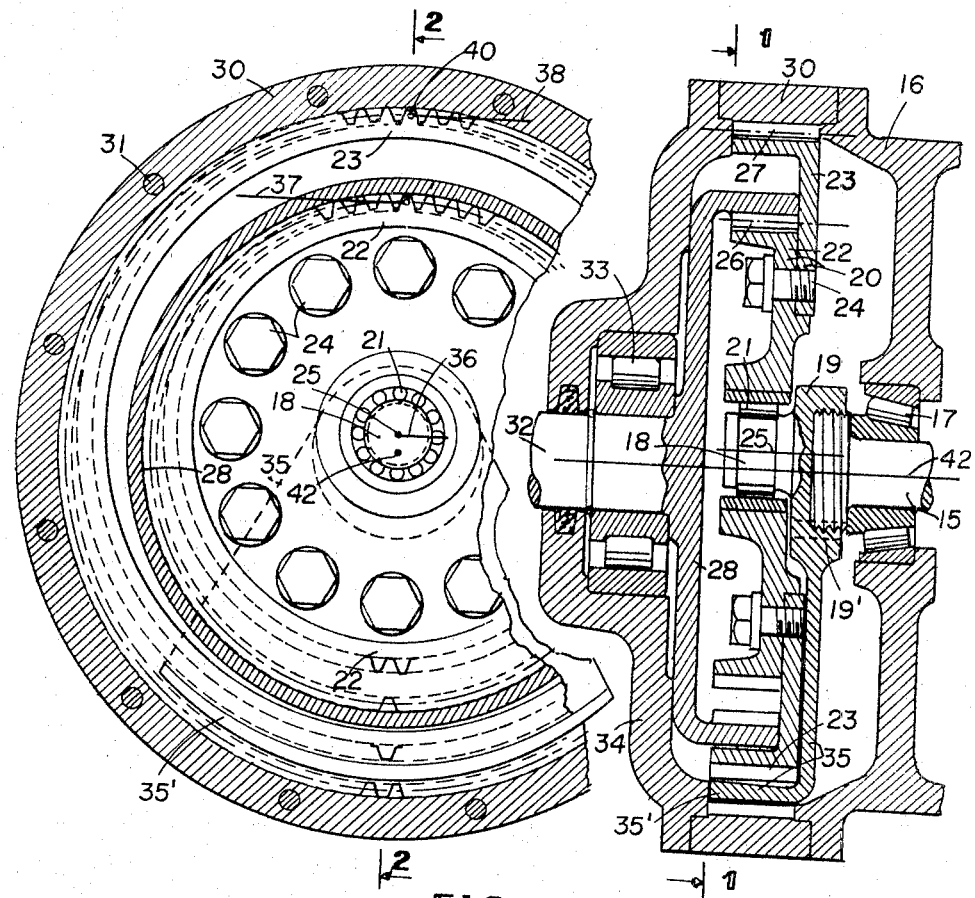
FIG. 1  FIG. 2
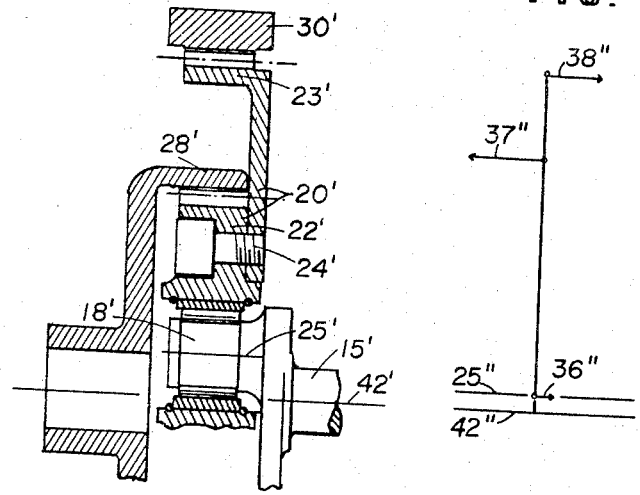
FIG. 3  FIG. 4  FIG. 5
INVENTOR:
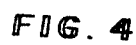
Ernest Wildhaber Feb. 18, 1969      E. WILDHABER      3,427,901
GEARING Filed Oct. 14, 1966      Sheet 2 of 2

INVENTOR:

Ernest Wildhaber

# United States Patent Office 3,427,901
Patented Feb. 18, 1969

3,427,901
GEARING
Ernest Wildhaber, Brighton, N.Y.
(124 Summit Drive, Rochester, N.Y. 14620)
Filed Oct. 14, 1966, Ser. No. 586,767
U.S. Cl. 74—804                                6 Claims
Int. Cl. F16h 3/48

ABSTRACT OF THE DISCLOSURE

This gear unit comprises planetary gearing connecting coaxial rotary driving and driven members, an internal gear being fixed to the driven member, and the driving member having an eccentric portion. A planet member, which is rotatably mounted on said eccentric portion, has two external gears of different diameter rigid with it. The teeth of these external gears overlap axially. There is a stationary internal gear coaxial with said rotary members; and the two external gears mesh with the two internal gears. The rotary internal gear drives an external gear disk with a wavy cross-section which drives a sun pinion which meshes with three planet gears rotatably mounted on the rotary driven member. A counterweight or counterweights are secured to the eccentric member.

---

The present invention relates to gearing in general and especially to planetary gearing containing two coaxial internal gears and a planet member with two sets of teeth meshing therewith, where the outside diameter of said two sets is more than two thirds of the inside diameter of the internal gears they mesh with.

One object of the invention is to attain a very compact drive of high efficiency even at large velocity ratios. A further object is to devise a planet disposition where the tooth loads do not exert a tilting moment on the planet, where the bearing load of the planet is moderate, and where the planet can be mounted eccentrically on a single bearing. This mounting and the mesh between external and internal gears of only small difference in diameter contribute to the high efficiency.

A further aim is to devise a planetary gearing of minimum width in axial direction.

A still other object is to drive one of two almost equally fast running gears from the other at high efficiency in an embodiment of the invention with fixed axes.

Other objects will appear in the course of the specification and in the recital of the appended claims.

In the drawings:

FIG. 1 is an axial view and a section along lines 1—1 of FIG. 2 of a planetary gear set constructed according to my invention.

FIG. 2 is an axial section thereof along lines 2—2 of FIG. 1, looking along the arrows.

FIG. 3 is a fragmentary axial section of a slightly modified embodiment of different ratio.

FIG. 4 is a diagram showing the axial forces in an embodiment with helical gear teeth.

FIG. 5 is a side view of a shaft containing an eccentric portion adapted to be supported on both sides thereof.

Figure 7:
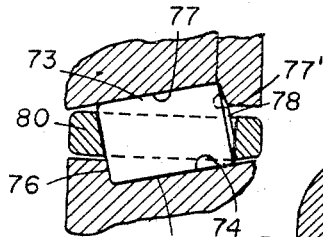
FIG. 7 is a fragmentary sectional view, at a larger scale, of bearing 70 shown in FIG. 6.

The gearing may be used either as a reduction gear or as a speed-increasing gear without changing its design features. It is therefore sufficient to describe it for speed reduction.

Referring to FIGS. 1 and 2, numeral 15 denotes the drive shaft on a reduction gear. It may be formed integral with the shaft of an electric or hydraulic motor, and then is rotatably mounted in the motor housing 16 on a pair of spaced bearings of which only bearing 17 is shown. An eccentric portion 18 is formed on a part 19 threaded onto the drive shaft and secured thereon by a pin 19', so that the eccentric is rigid with drive shaft 15. A bearing 21 on the eccentric rotatably mounts a planet 20 that is made up of two planet gears 22, 23 rigid with each other and of different diameter. They may be secured together with screws 24 or formed integral with each other.

The planet gears overlap in axial direction, in the direction of axis 25 of the eccentric portion. At least part of the teeth 26 of the smaller planet gear 22 have a common axial position with the teeth 27 of the larger planet gear, so that in the region of overlap planes perpendicular to axis 25 intersect the tooth zones of both gears 22, 23. Preferably the teeth 26 are aligned axially with the teeth 27, so that they extend within the axial reach of the teeth 27 and overlap them completely in axial direction.

The planet gears mesh with internal gears 28, 30 respectively of which preferably the larger one, 30, is stationary. It is secured to the housing 16, as by screws 31 (FIG. 1). The internal gear 28 is rigid with the driven shaft 32 that is mounted on a bearing 33 in the endplate 34. If desired, the bearing may be of the tapered type, like bearing 86 in FIG. 6, to exert moderate axial pressure between gear 28 and endplate 34. The endplate 34 is secured to the internal gear 30 and to the housing 16 by the screws 31 already mentioned.

A counter-weight 35 is formed rigid with the eccentric portion 18. It contains an arcuate projection 35' (FIG. 1) reaching into the space between the teeth of internal gear 30 and planet gear 23.

The invention gives a large range of reduction ratios. FIGS. 1 and 2 illustrate a 57:1 ratio, while FIG. 3 shows a 10½:1 ratio. The shown planetary gearing is of the differential type, a type generally thought of poor efficiency at large ratios. High efficiency is here attained in two ways: The intermeshing external and internal gears have only a small diameter difference, so that their tooth profiles differ only slightly. There is very little sliding between such teeth and almost pure rolling, so that the friction loss in the teeth is small. Furthermore, due to the axial overlap, the tooth loads are essentially in one plane, a central plane perpendicular to the teeth and perpendicular to the axis of the eccentric portion. This decreases the loads on the eccentric and on the bearings of the drive shaft. It avoids a tilting moment exerted on the planet when the planet gears are set side by side. Here now a single bearing 21 can be used to rotatably mount the planet.

FIG. 1 shows the circumferential load components or driving loads 36, 37, 38 exerted on the planet at the eccentric and at the planet gears 22, 23 respectively. The loads exerted on the planet are as if it were pivoted about the instantaneous axis 40 at the stationary internal gear 30. Component 36 at the eccentric portion is much smaller than the tooth load components 37, 38. The axial overlap of the teeth has the further advantage of decreasing the axial dimension and the weight of the drive.

Axis 25 of the eccentric portion 18 is parallel to axis 42 of the drive shaft and driven shaft and is offset therefrom a distance less than one tenth of the inside diameter of the larger internal gear. The amount of offset changes with the ratio of the gearing, as compared with said diameter. It decreases with increasing ratio at a rate slower than the ratio change.

In the embodiment of FIG. 3 the eccentric portion 18' is formed integral with the drive shaft 15'. The parts are otherwise similar to those shown in FIG. 2. Planet 20' is rotatably mounted on eccentric portion 18' and contains a pair of planet gears 22', 23' rigid with one another and secured together with screws 24'. The planet gears 22', 23' mesh with internal gears 28', 30' respectively, of which one is stationary and the other is the driven member in a reduction drive. In a speed-up drive the said other internal gear is the driver and shaft 15' or 15 is the driven shaft, the design remaining otherwise the same.

While FIGS. 2 and 3 show an overhung eccentric portion at one end of the drive shaft, FIG. 5 shows a drive shaft 44 extended at 45 to the opposite side of the eccentric 18a, so that it can be supported on both sides thereof.

The intermeshing external and internal gears of nearly equal diameter get into mesh very gradually and present no noise problem. For this reason I ordinarily use straight teeth on the gears. However helical teeth are well feasible. In this case I preferably use helical teeth of the same hand and of the same helix angle at the pitch surface on all four gears. This results in axial thrust loads 36", 37", 38" (FIG. 4) proportional to the circumferential load components 36, 37, 38 shown in FIG. 1. They maintain equilibrium in the axial plane of the planet also. There is no moment tending to tilt the planet. No spaced bearings are needed on the eccentric portion. However the bearing there should be of a type capable of taking axial thrust as well as as radial load.

It should be noted that the root diameter of the larger planet gear 23 or 23' exceeds the root diameter of the smaller internal gear 28 or 28' respectively by at least six times the eccentricity of the eccentric portion, the eccentricity being the distance between the axes 25 and 42 or 25' and 42'. The root diameter is known to be the diameter of the cylindrical gear-body surface from which the teeth project outwardly on an external gear, inwardly on an internal gear.

The gearing or gear combination can also be used on fixed axes, to drive one internal gear from the other, both rotating at high and only slightly different speed. The eccentric portion 18 is then stationary and does not revolve about axis 42. Otherwise the design is the same, except that no counter-weight is required.

The gearing again comprises three elements of which one is stationary, here the eccentric portion 18. Two of the elements are rigid respectively with two coaxial internal gears 28, 30 of different diameter. There is also a pair of external gears 22, 23 rigid with each other. They mesh respectively with said internal gears 28, 30 in regions lying radially on the same side of axis 42, both above axis 42 in FIG. 2, and are rotatably mounted on the eccentric portion which is here the stationary element.

As the mating tooth profiles used in the invention nearly coincide when in contact the stress on the tooth surfaces is low. It becomes possible to use lubricants of low viscosity, also known solid or semi-solid lubricants. At very high speeds even air lubrication may be feasible.

Figure 6:
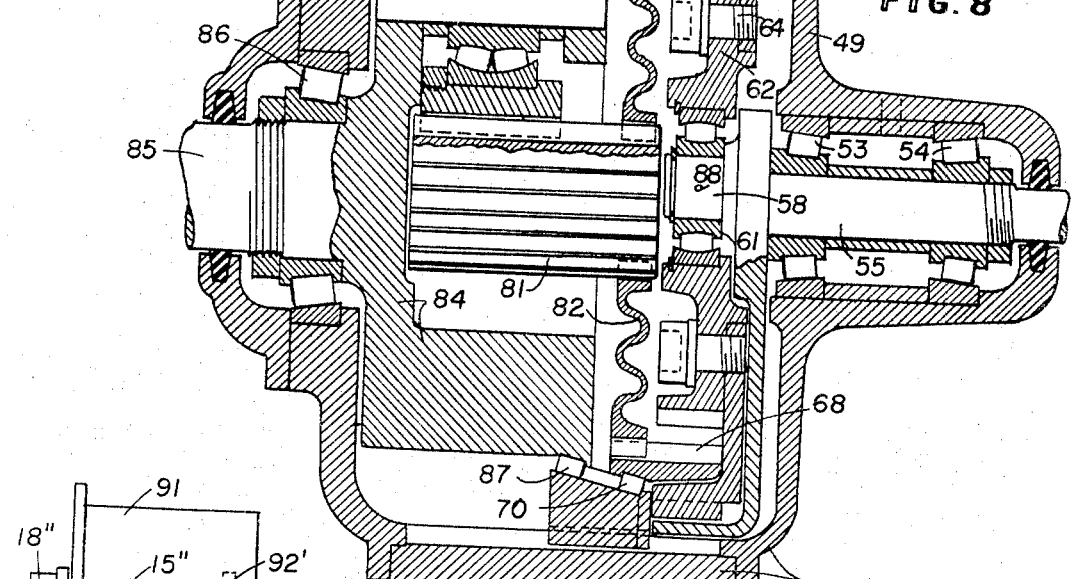
FIG. 6 is an axial section similar to FIG. 2, but showing an added planetary gear set for further increasing the velocity ratio.

FIG. 6 illustrates a combination of the described planetary gearing with a further planetary gearing to achieve a still higher reduction ratio. The unit is enclosed in a housing 47 made up of an internal gear 48 and two end plates, all rigidly secured together. The drive shaft 55 is rotatably mounted on spaced bearings 54, 53 in end plate 49. It contains an eccentric portion 58 on which a planet 60 is rotatably mounted by a spherical bearing 61. Planet 60 contains two planet gears 62, 63 rigid with each other and secured together with screws 64. Gears 62, 63 mesh with an internal gear 68 and with stationary internal gear 48 coaxial therewith, respectively. As before, the planet crosses the axis (42 in FIG. 1) of the internal gears. Internal gear 68 is rotatably mounted on a bearing 70 applied on its outside and having a larger diameter than the root diameter of gear 68. The outer part of bearing 70 is an insert 71 to internal gear 48. The insert is centered on the gear-tooth surfaces and maintained in a fixed position on gear 48, as by pins 72. Bearing 70 contains rolling elements such as rollers 73 (FIG. 7) or balls and ways shaped for double contact with said elements.

The rollers 73 shown are cylindrical. They contact way 74 with their outside surface 75 and with plane side surface 76. They contact way 77 with their outside surface 75 and way portion 77' with tapered side surface 78, in a region diagonally opposite to that of side surface 76. A cage 80 keeps the rollers in place.

Internal gear 68 drives a central transmission part of the second planetary gear set, namely its sun pinion 81, through means permitting slight radial displacement. A disk 82 with wavy cross-section in planes containing its axis of rotation permits such radial displacement. It is torsionally stiff when its waves extend in concentric circles about said axis. And it occupies a small axial space, an axial space less than one third of its outside diameter. Disk 82 engages the teeth of internal gear 68 and those of pinion 81, and its outer and inner ends are rigidly connected therewith, as for instance by brazing or welding.

Pinion 81 meshes with three planet gears 83 rotatably mounted on output member 84, and is centered by its triple mesh. The tooth loads force it to a position of equilibrium where equal loads are transmitted in the three meshes.

The second planetary gearing is of the type described in my Patent No. 3,178,966 granted Apr. 20, 1965, except that disk 82 is here substituted for the long drive shaft of the central pinion.

The output member 84 that carries the planets 83 is rigid with a shaft 85 and is rotatably mounted on two bearings 86 and 87. Bearing 86 may be a conventional tapered roller bearing whose outer race is secured to end plate 50. Roller bearing 87 has its outer raceway formed on insert 71 while the inner raceway may be on the planet carrier itself. Roller cages are not shown on these somewhat diagrammatic drawings.

With such double planetary drives ratios up to about 1000:1 with very large output torques are well feasible.

The first stage planetary gearing is designed so that the resultant tooth loads exerted on the planet are to pass through bearing center 88. Slight departures from this position are made up by guiding forces exerted on the planet by plane side 89 of endplate 49 and by plane side 90 of insert 71.

Figure 8:
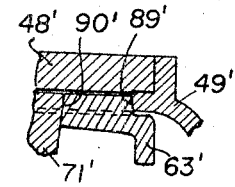
FIG. 8 is a fragmentary axial section of the stationary internal gear and adjacent parts of the first stage, and of the planet meshing therewith, showing a slightly modified design.

In the modification shown in FIG. 8 the guiding sides 89', 90' of endplate 49' and of insert 71' are slightly tapered. They are slightly hollow conical surfaces that engage convex conical surfaces of smaller radius provided at and adjacent the tooth ends of the larger planet 63'. This disposition localizes the side contact to the region adjacent the sectional plane of FIG. 8, and further decreases sliding at the side contact.

Figure 9:
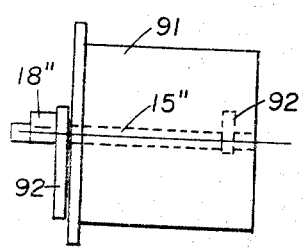
FIG. 9 is a diagram showing a modified disposition of the counter-balance means.

FIG. 9 diagrammatically illustrates a modified counter-weight disposition. The drive shaft 15" is rotatably mounted on spaced bearings in motor housing 91. It contains at one end an eccentric portion 18" for rotatably mounting a planet thereon. A main counter-weight 92 is rigid with the eccentric portion 18" and provided between said portion and the bearing support of the drive shaft. It is radially on the side opposite to the direction of offset of the eccentric portion. A minor counterweight 92' is placed adjacent the other end of the drive shaft 15". It is offset from the axis of the drive shaft in the same direction as the eccentric portion.

The two opposite counter-weights balance an inertia load axially outside of the position of the two counter-weights 92, 92'. They avoid the necessity of an arcuate lateral projection (35', FIG. 2) of counter-weight 92 and provide a drive shaft that can run at very high speeds.

Figure 10:
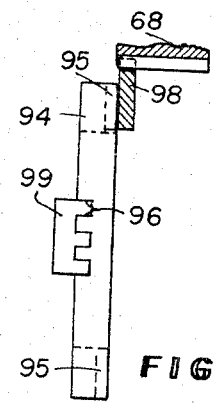
FIGS. 10 and 11 are a side view and a corresponding end view of a floating member that could be substituted for the disk 82 shown in FIG. 6, FIG. 10 also showing adjacent parts.
Figure 11:
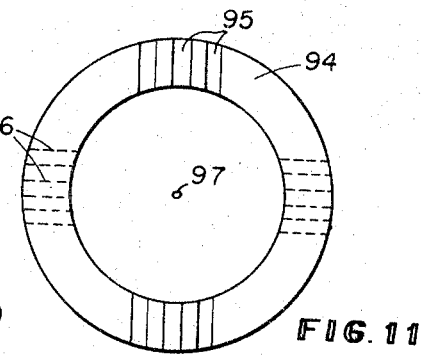

FIGS. 10 and 11 illustrate a modification that might be substituted for disk 82. Here the connection between the internal gear 68 and the pinion driven thereby is through a floating ring 94. Ring 94 contains straight ways 95, 96 extending at right angles to each other and to its axis 97. Ways 95 are engaged by a part 98 that is rigidly secured to internal gear 68. Ways 96 are engaged by a bar 99 rigidly secured to said pinion. The connection between gear 68 and the pinion is torsionally stiff but permits the pinion to adjust itself radially in all directions.

Numerous further modifications may be made in my invention without departing from its spirit, by simply applying the common knowledge and current practice of the art to which the invention pertains. For definition of its scope it is relied on the appended claims.

I claim:
1. Planetary gearing comprising a rotary driving member and a rotary driven member mounted to rotate on a common axis, an internal gear rigid with one of said rotary members, the other of said rotary members having an eccentric portion, a planet gear rotatably mounted on said eccentric portion, said planet gear crossing said common axis transversely, two external gears of different diameter rigid with one another and with said planet gear, the teeth of said external gears overlapping axially of said gears, a stationary internal gear coaxial with said rotary members, said external gears meshing, respectively, with said internal gears, a main counter-weight rigid with and disposed adjacent to said eccentric portion, and a minor counter-weight disposed further axially away from said eccentric portion but on the same side thereof as said main counter-weight.

2. Planetary gearing comprising a rotary driving member and a rotary driven member mounted to turn on a common axis, one of said rotary members containing an internal gear, the other of said rotary members having an eccentric portion, a planet rotatably mounted on said portion, said planet crossing said common axis and containing two external gears of different diameter rigid with one another, the teeth of said external gears overlapping in axial direction, a stationary internal gear coaxial with said rotary members, said external gears of the planet meshing, respectively, with said internal gears, the larger of the two internal gears being stationary, the root diameter of the larger external gear of the planet exceeding the root diameter of the rotary internal gear by at least six times the eccentricity of the eccentric portion of said other rotary member, the rotary internal gear being connected with a central transmission part through means permitting slight radial displacement, and said rotary internal gear being mounted on a bearing applied on its outside, said bearing having a larger diameter than the root diameter of said rotary internal gear.

3. Planetary gearing according to claim 2, wherein said bearing contains rolling elements and ways shaped for double contact with said elements.

4. Planetary gearing according to claim 2, wherein the transmission part is a sun gear of a second planetary gearing with three planets, said planets meshing with an internal gear rigid with and having teeth that are the continuation of the teeth of the stationary internal gear of the first-stage planetary gearing.

5. Planetary gearing according to claim 2, wherein the transmission part is a gear meshing with gears rotatably mounted on one element and meshing also with an internal gear forming part of another element, and wherein one of said two elements is stationary while the other element is the output member.

6. In a planetary gearing having a plurality of planet gears in mesh with a sun gear and with a gear coaxial with said sun gear, a member rotatable about the axis of said sun gear, and means connecting said member and said sun gear, said means being adapted to permit slight radial relative displacement between said member and said sun gear while occupying an axial space less than one-third of the outside diameter of said means, said means comprising a disk having a wavy cross-section in a plane containing the axis of rotation of said disk, the waves of said disk extending principally in a radial direction in said plane.

References Cited
UNITED STATES PATENTS

| | | | |
|---|---|---|---|
| 978,371 | 12/1910 | Harrison | 74—804 |
| 2,170,951 | 8/1939 | Perry | 74—804 |
| 2,750,814 | 6/1956 | Wildhaber | 74—805 |
| 2,863,336 | 12/1958 | Parstorfer | 74—804 |
| 2,906,143 | 9/1959 | Musser | 74—804 X |
| 3,056,315 | 10/1962 | Mros | 74—805 |

FOREIGN PATENTS

| | | |
|---|---|---|
| 889,846 | 1/1944 | France. |

ARTHUR T. McKEON, *Primary Examiner.*